US012533581B2

(12) United States Patent
Wang et al.

(10) Patent No.: US 12,533,581 B2
(45) Date of Patent: Jan. 27, 2026

(54) METHOD FOR PROCESSING GAME CONTROL INSTRUCTION AND EXTENSION DEVICE OF GAME CONTROLLER

(71) Applicant: QINGDAO THUNDEROBOT TECHNOLOGY CO., LTD, Shandong (CN)

(72) Inventors: Shaohua Wang, Qingdao (CN); Yanbing Li, Qingdao (CN); Kailin Lu, Qingdao (CN)

(73) Assignee: QINGDAO THUNDEROBOT TECHNOLOGY CO., LTD, Shandong (CN)

( * ) Notice: Subject to any disclaimer, the term of this patent is extended or adjusted under 35 U.S.C. 154(b) by 329 days.

(21) Appl. No.: 18/336,624

(22) Filed: Jun. 16, 2023

(65) Prior Publication Data

US 2024/0278119 A1 Aug. 22, 2024

(30) Foreign Application Priority Data

Feb. 20, 2023 (CN) ......................... 202310144990.5

(51) Int. Cl.
*A63F 13/42* (2014.01)
*A63F 13/22* (2014.01)

(52) U.S. Cl.
CPC .............. *A63F 13/42* (2014.09); *A63F 13/22* (2014.09)

(58) Field of Classification Search
CPC ................................ A63F 13/42; A63F 13/22
See application file for complete search history.

(56) References Cited

U.S. PATENT DOCUMENTS

2005/0215322 A1* 9/2005 Himoto .................. A63F 13/22 463/37
2011/0312417 A1* 12/2011 MacKay .............. A63F 13/847 463/38

(Continued)

FOREIGN PATENT DOCUMENTS

JP 2002-000945 1/2002
JP 2020-018402 2/2020

(Continued)

OTHER PUBLICATIONS

Extended European Search Report for European Patent Application No. 23178810.0 dated Jan. 2, 2024 (12 pages).

(Continued)

*Primary Examiner* — Malina D. Blaise
(74) *Attorney, Agent, or Firm* — troutman pepper locke; Tim Tingkang Xia, Esq.

(57) ABSTRACT

A method for processing a game control instruction and an extension device of a game controller are provided. The extension device is connected with the game controller and a controlled game console, and the method for processing a game control instruction includes: acquiring a control instruction received by the extension device through a controller interface, the controller interface being connected with a console connection interface of the game controller; parsing the control instruction to obtain a first key instruction according to an instruction encoding rule of the game controller; acquiring a second key instruction generated by triggering a key of the extension device; recoding the first key instruction and the second key instruction according to an instruction encoding rule of the controlled game console to obtain a compatible instruction; and sending the compatible instruction to the controlled game console through the console connection interface of the extension device.

14 Claims, 5 Drawing Sheets

(56) References Cited

U.S. PATENT DOCUMENTS

| | | | | |
|---|---|---|---|---|
| 2017/0001109 | A1* | 1/2017 | Dornbusch | A63F 13/24 |
| 2018/0193740 | A1* | 7/2018 | Oizumi | A63F 13/31 |
| 2018/0326299 | A1* | 11/2018 | Muramatsu | A63F 13/22 |
| 2020/0038766 | A1* | 2/2020 | Dornbusch | A63F 13/30 |
| 2020/0061456 | A1* | 2/2020 | Bruckbock | H02J 7/0044 |
| 2020/0222799 | A1* | 7/2020 | Chang | A63F 13/98 |
| 2024/0278119 | A1* | 8/2024 | Wang | A63F 13/23 |

FOREIGN PATENT DOCUMENTS

| | | |
|---|---|---|
| JP | 6968477 | 11/2021 |
| WO | WO 2022/0564723 | 12/2022 |

OTHER PUBLICATIONS

Office Action for Japanese Patent Application No. 2023-113439 dated Feb. 6, 2024 w/English translation (8 pages).

* cited by examiner

METHOD FOR PROCESSING GAME CONTROL INSTRUCTION AND EXTENSION DEVICE OF GAME CONTROLLER

CROSS-REFERENCE TO RELATED APPLICATION

This application claims priority to Chinese Appl. 202310144990.5 filed on Feb. 20, 2023, the entire contents of which are incorporated herein by reference.

FIELD OF THE INVENTION

The present invention relates to information processing, and particularly to a method for processing a game control instruction and an extension device of a game controller.

BACKGROUND OF THE INVENTION

A game controller is an input device of an electronic game machine, and an object, such as a simulated character in an electronic game, or the like, can be controlled by manipulating a button, a stick, or the like, of the game controller. The game controller is generally provided in a form of a gamepad.

The gamepads designed by different manufacturers have different shapes, hand feels, functions, or the like. With a development of electronic game industry, a large number of game platforms appear, such as Xbox by Microsoft, PlayStation series by Sony and Switch by Nintendo.

The game controllers used in game devices (or called game consoles) of some game platforms can only support the game platforms of their own; for example, a Switch Pro gamepad only has an instruction set of Nintendo, is only compatible with a game device of Nintendo, and cannot be linked with other devices, thus limiting use scenarios of various game platforms. This situation affects universality of a gamepad device and reduces use experiences of a game player.

SUMMARY OF THE INVENTION

An object of the present invention is to provide a method for processing a game control instruction and an extension device of a game controller, which are suitable for game consoles of different platforms.

A further object of the present invention is to expand functions of the game controller.

Another object of the present invention is to improve a use experience for a game user.

Particularly, the present invention provides a method for processing a game control instruction. An extension device of a game controller executing the method for processing a game control instruction relates to the game controller and a controlled game console, and the method for processing a game control instruction includes:

acquiring a control instruction received by the extension device through a controller interface, the controller interface being connected with a console connection interface of the game controller;

parsing the control instruction to obtain a first key instruction according to an instruction encoding rule of the game controller;

acquiring a second key instruction generated by triggering a key of the extension device; recoding the first key instruction and the second key instruction according to an instruction encoding rule of the controlled game console to obtain a compatible instruction; and sending the compatible instruction to the controlled game console through the console connection interface of the extension device.

Optionally, before the step of acquiring a control instruction received by the extension device through a controller interface, the method further includes: acquiring configuration information of the extension device, the configuration information including key value information, and the key value information being used for defining a key value of the key of the extension device; and the step of acquiring a second key instruction generated by triggering a key of the extension device includes: acquiring a trigger signal of the key of the extension device, and converting the trigger signal into the second key instruction according to the key value information.

Optionally, the key of the extension device includes a linear key, and the configuration information further includes a linear function start-stop option, and the step of acquiring a trigger signal of the key of the extension device includes: receiving a pressing signal of the linear key; judging whether the linear function start-stop option is configured to be started; if yes, generating the trigger signal with a strength value according to a key stroke depth of the pressing signal; and if no, generating the trigger signal under a condition that the key stroke depth of the pressing signal is greater than a set trigger threshold.

Optionally, the configuration information further includes controller modification information, and the step of recoding the first key instruction and the second key instruction according to an instruction encoding rule of the controlled game console further includes: modifying the first key instruction according to the controller modification information, and recoding the modified first key instruction and the second key instruction according to the instruction encoding rule of the controlled game console.

Optionally, the configuration information further includes a conflict handling option, and the conflict handling option includes: controller priority, extension device priority, and concurrent use, and under a condition that the conflict handling option is set as the controller priority, the step of recoding the first key instruction and the second key instruction according to an instruction encoding rule of the controlled game console further includes: identifying whether a duplicate key value exists in the first key instruction and the second key instruction, if yes, deleting a duplicate key value part in the second key instruction, and recoding the first key instruction and the second key instruction after the duplicate key value part is deleted according to the instruction encoding rule of the controlled game console;

under a condition that the conflict handling option is set as the extension device priority, the step of recoding the first key instruction and the second key instruction according to an instruction encoding rule of the controlled game console further includes: identifying whether a duplicate key value exists in the first key instruction and the second key instruction, if yes, deleting a duplicate key value part in the first key instruction, and recoding the first key instruction after the duplicate key value part is deleted and the second key instruction according to the instruction encoding rule of the controlled game console; and under a condition that the conflict handling option is set as the concurrent use, the step of recoding the first key instruction and the second key instruction according to an instruction encoding rule of the controlled game console further includes: identifying whether a duplicate key value exists in the first key instruction and the second key instruction, if yes, simultaneously retaining a duplicate key value part in the first key instruction and the second key instruction, and recoding the first key instruction and the second key instruction according to the instruction encoding rule of the controlled game console.

Optionally, the step of acquiring configuration information of the extension device includes:

connecting a configuration terminal using a terminal connection interface of the extension device; and receiving a configuration file sent by the configuration terminal, and parsing the configuration file to obtain the configuration information.

Optionally, the controller interface is configured as a wired transmission interface matched with the console connection interface of the game controller, and the terminal connection interface and the console connection interface are configured as independent wireless transmission interfaces.

Optionally, before the step of acquiring a control instruction received by the extension device through a controller interface, the method further includes: acquiring feature information of the game controller and the controlled game console; determining the instruction encoding rule of the game controller according to the feature information of the game controller; and determining the instruction encoding rule of the controlled game console according to the feature information of the controlled game console.

Optionally, the step of determining the instruction encoding rule of the controlled game console according to the feature information of the controlled game console includes: inquiring whether the extension device stores a corresponding instruction encoding rule according to the feature information of the controlled game console;

if yes, calling the instruction encoding rule of the controlled game console; and if no, sending a rule inquiring request to a network service device, and acquiring an instruction encoding rule responding to the rule inquiring request from the network service device.

According to another aspect of the present invention, there is further provided an extension device of a game controller configured to be attached to the game controller, including: a controller interface configured to be connected with a console connection interface of the game controller;

the console connection interface configured to be connected with a controlled game console; and a processor, a memory and a machine executable program stored in the memory and run on the processor, the processor, when executing the machine executable program, implementing the method for processing a game control instruction according to any one of the above descriptions.

In the method for processing a game control instruction and the extension device of a game controller according to the present invention, the extension device of a game controller is connected with the game controller and the controlled game console respectively. The extension device receives the control instruction of the game controller through the controller interface, the control instruction is parsed to obtain the first key instruction, the second key instruction is generated utilizing a trigger condition of the key of the extension device, and the first key instruction and the second key instruction are recoded according to the instruction encoding rule of the controlled game console to obtain the compatible instruction; finally, the compatible instruction sent by the extension device to the controlled game console can be recognized by the controlled game console after recoding. The above re-processing process can make the game controller applied to different kinds of game platforms, compatibility of the game controller is achieved, and the game controller is not limited to an original console. In addition, the functions of the game controller are expanded by the key of the extension device, and game keys can be enriched, thus facilitating an operation of the user.

Further, in the method for processing a game control instruction according to the present invention, the configuration information can provide rich user-defined functions, game requirements of the user are fully met, game functions are supported, the functions which the game controller does not have can be achieved, and in addition, new functions of the game controller can be provided by modifying the instruction of the game controller.

Further, with the extension device of a game controller according to the present invention, the linear key can be added for the game controller, thereby enriching the experience of the user.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION OF THE INVENTION

Figure 1:
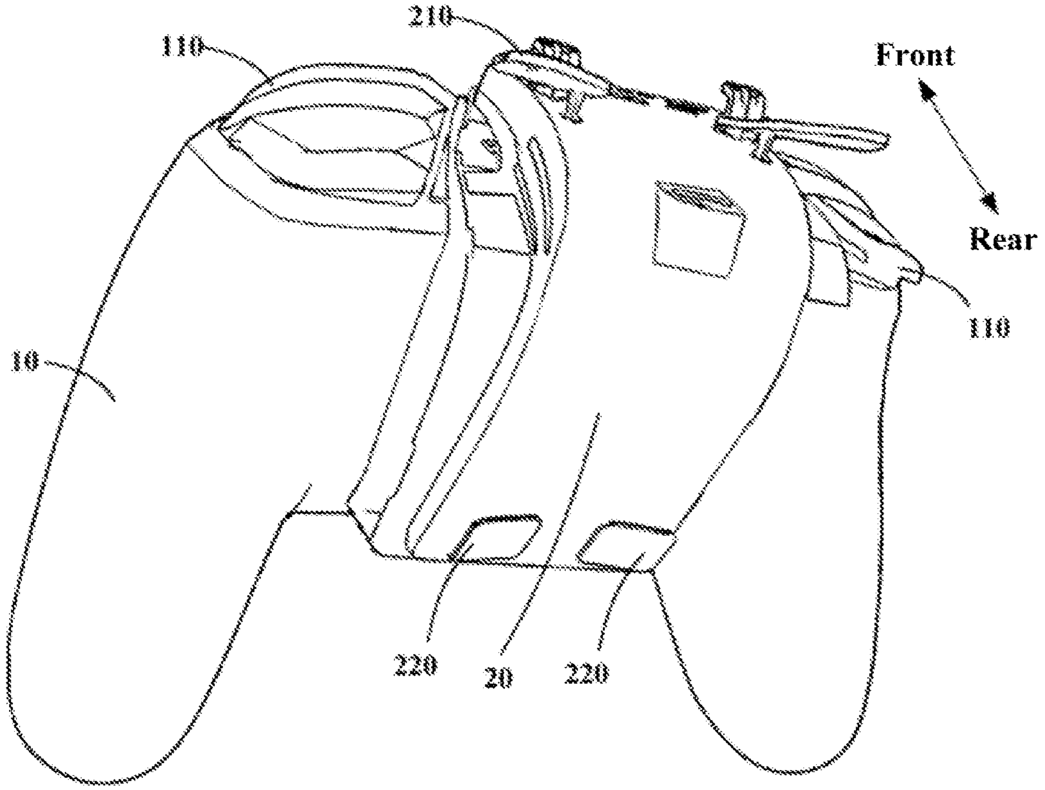
FIG. 1 is a schematic diagram of an extension device of a game controller according to an embodiment of the present invention.

In the description of embodiments, it should be understood that orientations or positional relationships indicated by terms “front”, “rear”, etc. are based on the orientation of a game controller 10 in a normal use state as a reference, and can be determined with reference to the orientations or positional relationships shown in the drawings; for example, “front” indicating the orientation refers to a side of the game controller 10 facing a game. It is used only for conveniently describing the embodiments, but does not indicate or imply that an indicated apparatus or element must have a specific orientation or be constructed and operated in a specific orientation. Therefore, it cannot be understood as a limitation on the present invention.

Figure 2:
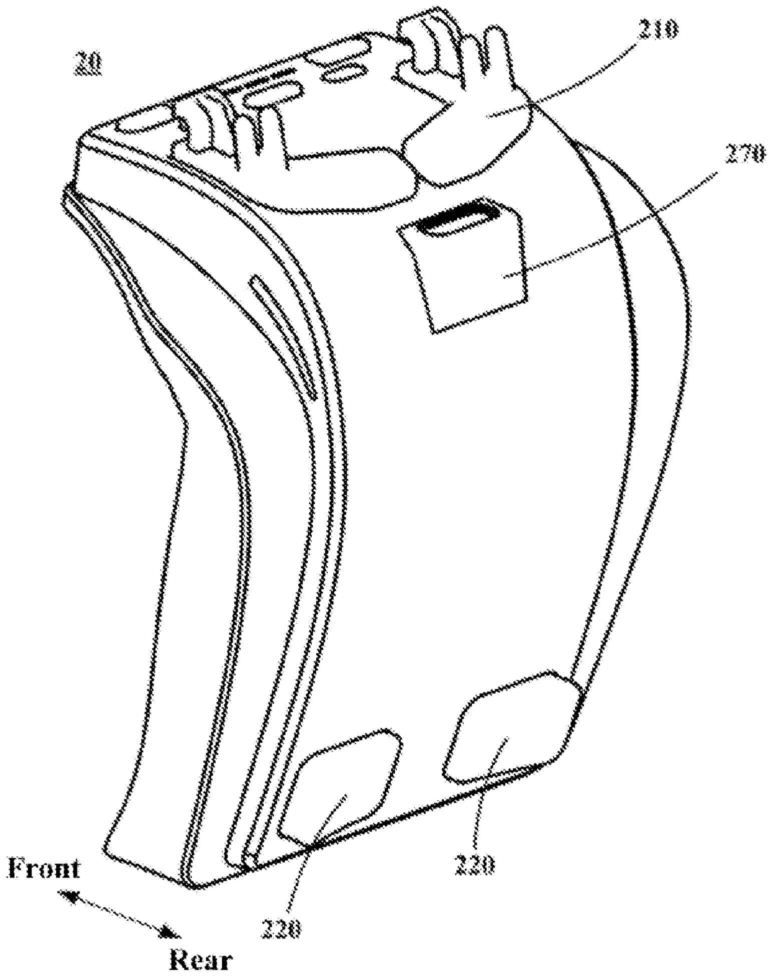
FIG. 2 is a schematic diagram after assembly of the extension device of a game controller shown in FIG. 1 and the game controller.
Figure 3:
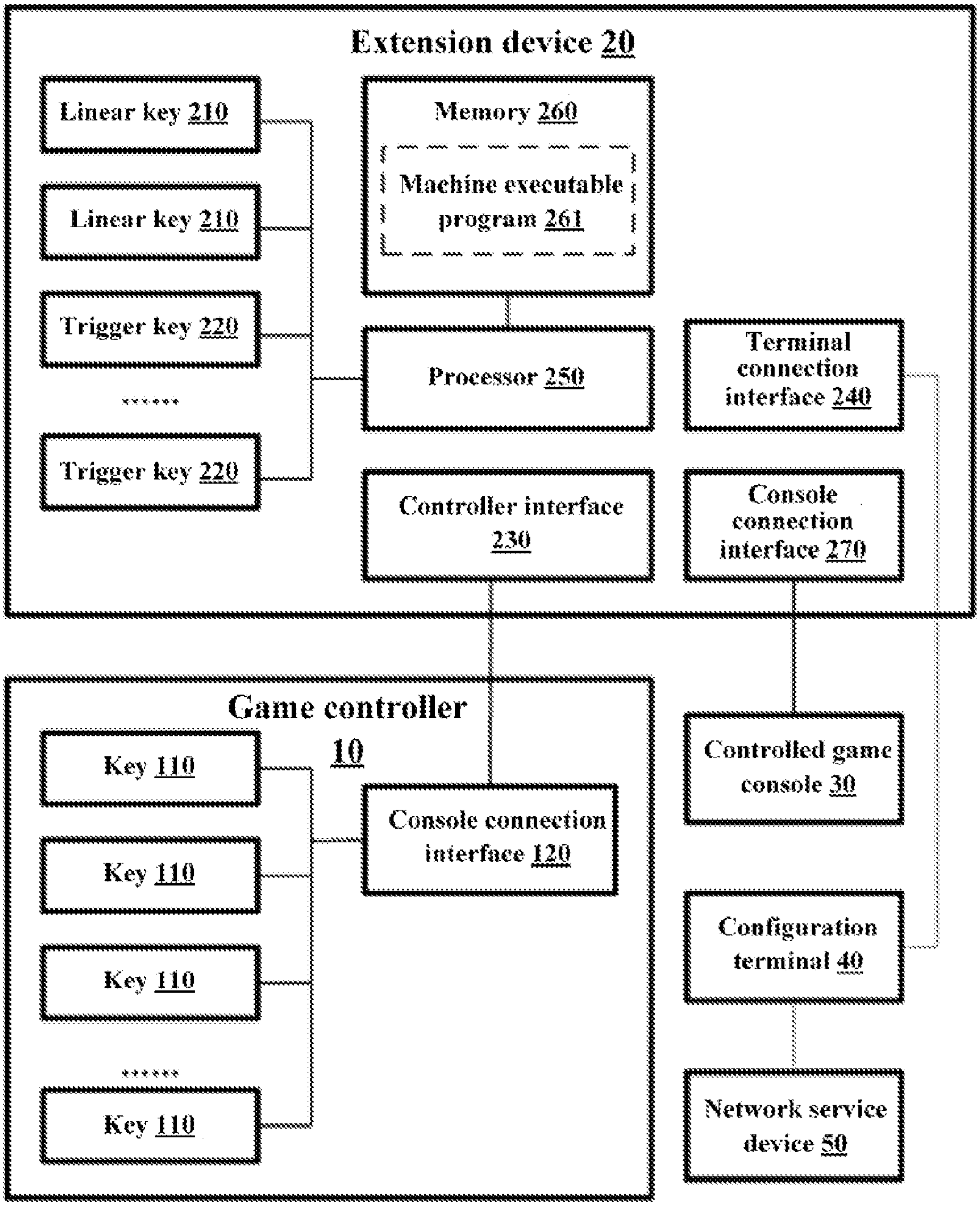
FIG. 3 is a system architecture diagram when an extension device of a game controller according to an embodiment of the present invention is applied to a game system.

FIG. 1 is a schematic diagram of an extension device of a game controller according to an embodiment of the present invention; FIG. 2 is a schematic diagram after assembly of the extension device of a game controller shown in FIG. 1 and the game controller; FIG. 3 is a system architecture diagram when an extension device of a game controller according to an embodiment of the present invention is applied to a game system.

The present embodiment first provides an extension device 20 for a game controller 10, and the extension device 20 can be detachably mounted on the game controller 10 to expand the number of keys and/or key functions of the game controller 10. The game controller 10 may be a gamepad or other game manipulation devices, such as a Switch series gamepad, a PS series gamepad, an Xbox series gamepad, and gamepads by other third party manufacturers. The extension device 20 has a connection structure with a shape matched with a shape of the game controller 10, and is mounted to the game controller 10 by clamping, or the like. In the embodiment shown in FIGS. 1 and 2, the extension device 20 may be mounted to a back of the game controller 10 and has an attachment surface with an external contour matched with external contours of a side surface and the back of the game controller 10.

The game controller 10 has a plurality of keys 110 (including pressed physical keys and a joystick or touch key equivalent to the physical keys). The game controller 10 converts trigger signals of the plurality of keys 110 into control instructions according to an encoding rule thereof through a control board thereof, and the control instructions can be used for a game console 30 matched with the game controller 10. In the prior art, the game controller 10 can be directly connected with the matched game console 30 using a console connection interface 120 thereof. The console connection interface 120 of the game controller 10 may be a wired interface (for example, a USB interface) or a wireless interface (for example, Bluetooth, Wi-Fi, or the like).

A controller interface 230 of the extension device 20 according to the present embodiment is matched with the console connection interface 120 of the game controller 10. For example, in some embodiments, the controller interface 230 of the extension device 20 and the console connection interface 120 of the game controller 10 may be USB interfaces fitted with each other, for example, the controller interface 230 of the extension device 20 is a USB Type-C male interface, and the console connection interface 120 of the game controller 10 is a USB Type-C female interface.

The extension device 20 is provided with a plurality of keys 210, 220 which may include a linear key 210 and a trigger key 220, and output of the linear key 210 may be a numerical value corresponding to a pressed key stroke depth, which may be understood as generation of a trigger signal with a strength value. In some embodiments, the output of the linear key 210 may vary between 0 and 255. The linear key 210 may be used as a key trigger, for example, as an accelerator or other variables during game play. The linear key 210 of the extension device 20 may expand the functions of the game controller 10 in a case where the game controller 10 does not have a linear key. The trigger key 220 may be a common on-type key or touch key, which may be configured to replace the key 110 of the game controller 10, or may serve as a newly added key, so as to expand the game controller 10.

The extension device 20 may be connected with a controlled game console 30 using a console connection interface 270, that is, send a control instruction to the controlled game console 30 through the console connection interface 270. The console connection interface 270 may be configured according to a connection interface possibly configured by the controlled game console 30, for example, configured as a wired interface, such as a USB interface, or the like, or a wireless connection interface, such as Bluetooth interface, or the like.

The extension device 20 may also be connected with a configuration terminal 40 using a terminal connection interface 240. The configuration terminal 40 may be an intelligent terminal, such as a mobile phone, a tablet computer, or the like, which may be provided with an application app for configuring the extension device 20, such that a user may configure functions, performances, or the like, of the extension device 20. In some embodiments, the extension device 20 may further be connected with a network service device 50 through the configuration terminal 40, so as to acquire an encoding rule, or the like, from a network.

That is, the controller interface 230 is configured as a wired transmission interface (USB Type-C, or the like) matched with the console connection interface 120 of the game controller 10, and the terminal connection interface and the console connection interface are configured as independent wireless transmission interfaces. In some embodiments, the extension device 20 may be provided with plural Bluetooth interfaces independent of each other as the controller interface 230, the terminal connection interface 240, and the console connection interface 270; for example, a traditional Bluetooth 2.0 interface may be used as the controller interface 230, and BLE may be used as the terminal connection interface 240.

The extension device 20 is further provided with a processor 250, a memory 260, and a machine executable program 261 stored in the memory 260 and run on the processor 250, and the processor 250, when executing the machine executable program 261, implements any method for processing a game control instruction according to the present embodiment.

The processor 250 may be a single-core processor, a multi-core processor, a computing cluster, or any number of other configurations. The memory 260 may include a random access memory (RAM), a read only memory, a flash memory, or any other suitable storage systems.

The processor 250 may be connected to an I/O interface (input/output interface) of one or more I/O devices (input/output devices). The I/O device may include any of the keys 210, 220 described above.

The machine executable program 261 described herein may be downloaded to the memory 260 over a network, such as the Internet, a local area network, a wide area network, and/or a wireless network.

It should be noted that the flow chart and the block diagram in the specification show system architectures, functions and operations that may be implemented by the system, method and computer program product according to plural embodiments of the present invention. In this regard, each block in the flow chart or block diagram may represent a module, program segment, or portion of an instruction, which includes one or more executable instructions for implementing the specified logical function(s). In some alternative implementations, the functions noted in the blocks may occur out of the order noted in the drawings. For example, two blocks shown in succession may, in fact, be executed substantially concurrently, or the blocks may sometimes be executed in a reverse order, depending upon the functionality involved. It will also be noted that each block in the block diagram and/or flow chart, and combinations of the blocks in the block diagram and/or flow chart, can be implemented by special purpose hardware-based systems that perform the specified functions or acts, or combinations of special purpose hardware and computer instructions.

Figure 4:
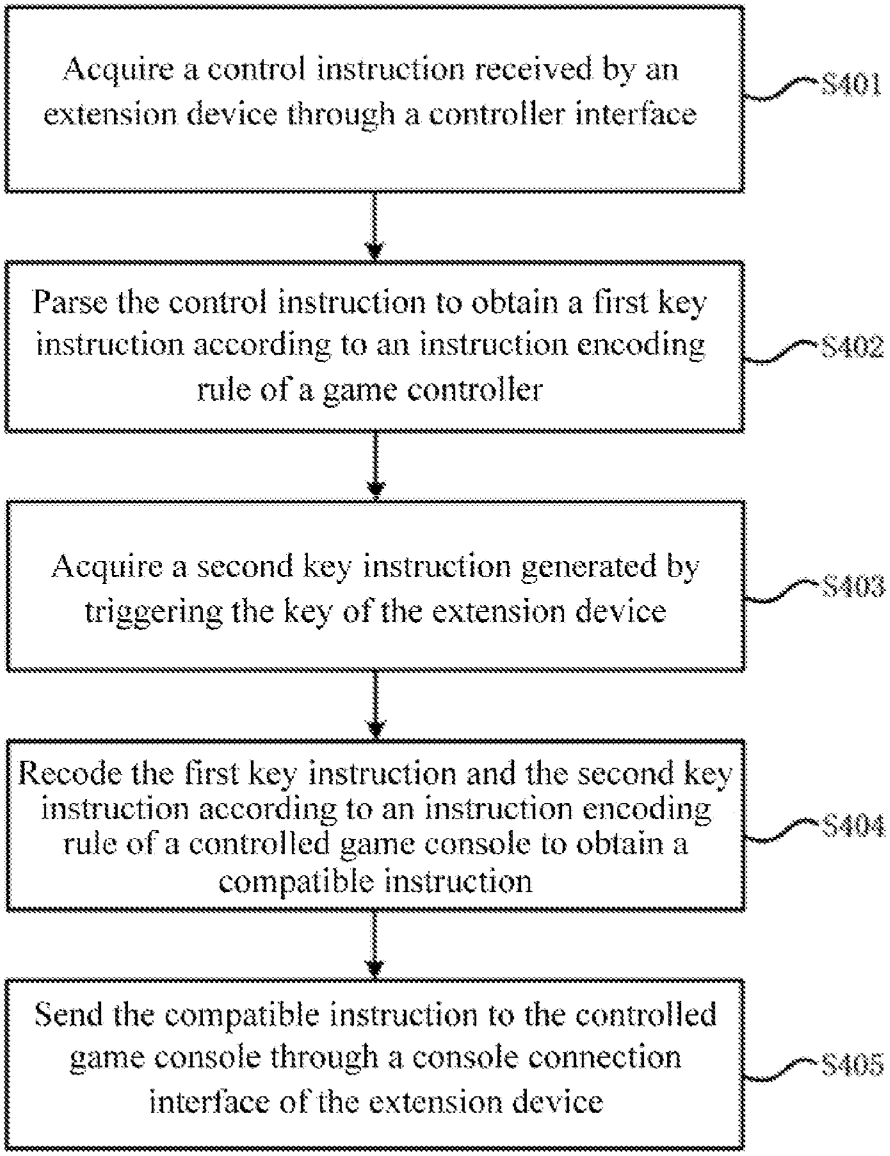
FIG. 4 is a schematic flow diagram of a method for processing a game control instruction according to an embodiment of the present invention.

FIG. 4 is a schematic flow diagram of a method for processing a game control instruction according to an embodiment of the present invention, and the method for processing a game control instruction may include:

step S401: acquiring a control instruction received by the extension device 20 through the controller interface 230.

Step S402: parsing the control instruction to obtain a first key instruction according to an instruction encoding rule of the game controller 10.

Step S403: acquiring a second key instruction generated by triggering the keys 210, 220 of the extension device 20.

Step S404: recoding the first key instruction and the second key instruction according to an instruction encoding rule of the controlled game console 30 to obtain a compatible instruction.

Step S405: sending the compatible instruction to the controlled game console through the console connection interface 270 of the extension device 20.

In the method, the extension device 20 receives the control instruction of the game controller 10 through the controller interface 230, the control instruction is parsed to obtain the first key instruction, the second key instruction is generated utilizing the trigger condition of the keys 210, 220 of the extension device 20, and the first key instruction and the second key instruction are recoded according to the instruction encoding rule of the controlled game console 30 to obtain the compatible instruction; finally, the compatible instruction sent by the extension device 20 to the controlled game console 30 can be recognized by the controlled game console after recoding. The above re-processing process can make the game controller 10 applied to different kinds of game platforms, such that the game controller 10 is more universal and is not limited to the original console. In addition, the functions of the game controller 10 are expanded by the keys 210, 220 of the extension device 20, and game keys can be enriched, thus facilitating the operation of the user.

Before step 401, the method according to the present embodiment may further include: first acquiring configuration information of the extension device 20. The configuration information may include key value information, a linear function start-stop option, controller modification information, a conflict handling option, or the like, for configuring the function and performance of the extension device 20.

The key value information is used to define key values of the keys 210, 220. Step S403 may include: acquiring a trigger signal of the key of the extension device; and converting the trigger signal into the second key instruction according to the key value information. That is, the key values of the keys 210, 220 of the extension device 20 may both support user definition.

In a case where the extension device 20 is provided with the linear key 210, the linear function start-stop option may be used to define whether the linear key 210 is used as a linear trigger or simply as a common key. Step S403 may further include: receiving a pressing signal of the linear key; judging whether the linear function start-stop option is configured to be started; if yes, generating the trigger signal with a strength value according to the key stroke depth of the pressing signal; and if no, generating the trigger signal under a condition that the key stroke depth of the pressing signal is greater than a set trigger threshold. The linear key 210 may provide, for the game controller 10, functions that the game controller 10 does not have, thereby accomplishing more game tasks. For games which do not require linear functions, the linear key 210 may be selected not to be used, or defined as another common key, and a trigger key stroke may be set.

The controller modification information may be used to configure and modify the function or performance of the game controller 10, for example, modify the key value, sensitivity, a response curve, a dead zone range, or the like, of the key 110 of the game controller 10. After the controller modification information is set, step S404 may include: modifying the first key instruction according to the controller modification information, and recoding the modified first key instruction and the second key instruction according to the instruction encoding rule of the controlled game console 30. That is, the recoding process of the extension device 20 adapts the instruction to the controlled game console 30, and can also personalize the game controller 10.

The conflict handling option includes: controller priority, extension device priority, and concurrent use.

Under a condition that the conflict handling option is set as the controller 10 priority, the step of recoding the first key instruction and the second key instruction according to an instruction encoding rule of the controlled game console 30 further includes: identifying whether a duplicate key value exists in the first key instruction and the second key instruction, if yes, deleting a duplicate key value part in the second key instruction, and recoding the first key instruction and the second key instruction after the duplicate key value part is deleted according to the instruction encoding rule of the controlled game console 30. That is, in the case of the controller 10 priority, if the key values of the keys 210, 220 of the extension device 20 conflict with the key value of the key 110, the control instruction of the key 110 is merely retained, and a response to the keys 210, 220 is ignored.

Under a condition that the conflict handling option is set as the extension device 20 priority, the step of recoding the first key instruction and the second key instruction according to an instruction encoding rule of the controlled game console 30 further includes: identifying whether a duplicate key value exists in the first key instruction and the second key instruction, if yes, deleting a duplicate key value part in the first key instruction, and recoding the first key instruction after the duplicate key value part is deleted and the second key instruction according to the instruction encoding rule of the controlled game console 30. That is, in the case of the extension device 20 priority, if the key values of the keys 210, 220 of the extension device 20 conflict with the key value of the key 110, the control instruction of the keys 210, 220 is merely retained, and a response to the key 110 is ignored.

Under a condition that the conflict handling option is set as the concurrent use, the step of recoding the first key instruction and the second key instruction according to an instruction encoding rule of the controlled game console 30 further includes: identifying whether a duplicate key value exists in the first key instruction and the second key instruction, if yes, simultaneously retaining a duplicate key value part in the first key instruction and the second key instruction, and recoding the first key instruction and the second key instruction according to the instruction encoding rule of the controlled game console 30. That is, in the case of the concurrent use, if the key values of the keys 210, 220 of the extension device 20 conflict with the key value of the key 110, the control instruction of the key 110 and the control instruction of the keys 210, 220 are both retained, and the control instructions are encoded according to a pressed sequence of the key 110 and the keys 210, 220, such that the user can obtain a response when pressing any conflicting key.

Before step S401, the method may further include: acquiring feature information of the game controller 10 and the controlled game console 30 respectively; determining the instruction encoding rule of the game controller 10 according to the feature information of the game controller 10; and determining the instruction encoding rule of the controlled game console 30 according to the feature information of the controlled game console 30. The feature information of the game controller 10 and the controlled game console 30 may include models, specifications, or the like, of the game controller 10 and the controlled game console 30. The corresponding encoding and decoding rules may be correspondingly obtained using the feature information of the game controller 10 and the controlled game console 30. The above feature information may be input by the game user, or determined by the extension device 20 by means of instruction detection. A process of determining the models and specifications of the game controller 10 and the controlled game console 30 by the extension device 20 by means of instruction detection may include: sending, by the extension device 20, different detection instructions to the game controller 10 and the controlled game console 30 respectively, and determining the platform of the game controller 10 and that of the controlled game console 30 according to responses of the game controller 10 and the controlled game console 30 to the detection instructions.

The step of determining the instruction encoding rule of the controlled game console 30 according to the feature information of the controlled game console 30 may include: inquiring whether the extension device stores a corresponding instruction encoding rule according to the feature information of the controlled game console 30; if yes, calling the instruction encoding rule of the controlled game console 30; and if no, sending a rule inquiring request to the network service device 50, and acquiring an instruction encoding rule responding to the rule inquiring request from the network service device 50. The instruction encoding rule of the game controller 10 is determined in a similar manner to the instruction encoding rule of the controlled game console 30, and if the extension device 20 is not provided with the encoding rule, the encoding rule may be requested from the network service device 50. In this way, the extension device 20 can adapt to the latest game console 30 and game controller 10, thereby further improving universality of the extension device 20.

Figure 5:
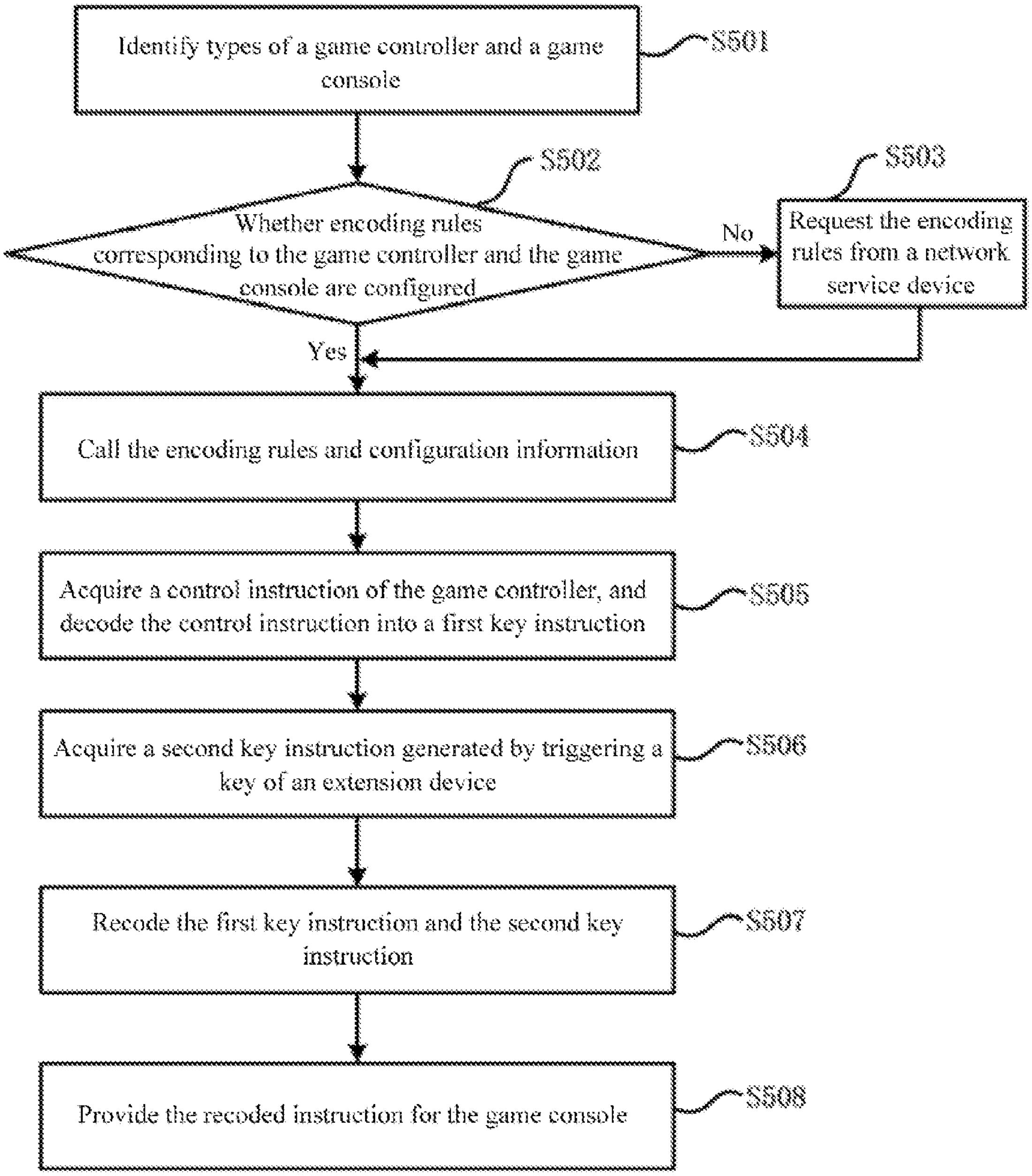
FIG. 5 is a flow chart of an application example of a method for processing a game control instruction according to an embodiment of the present invention.

FIG. 5 is a flow chart of an application example of a method for processing a game control instruction according to an embodiment of the present invention. The flow shows a working process of the extension device 20, and after the extension device 20 is connected with the game controller 10 and the game console 30, the following steps may be included:

step S501: identifying types of the game controller 10 and the game console 30;

step S502: checking whether encoding rules corresponding to the game controller 10 and the game console 30 are configured;

step S503: if no, requesting the encoding rules from the network service device 50;

step S504: calling the encoding rules and configuration information;

step S505: acquiring a control instruction of the game controller 10, and decoding the control instruction into a first key instruction;

step S506: acquiring a second key instruction generated by triggering a key of the extension device 20;

step S507: recoding the first key instruction and the second key instruction; and step S508: providing the recoded instruction for the game console 30.

With the method for processing a game control instruction and the extension device of a game controller according to the present embodiment, the game controller 10, such as Switch Pro, or the like, can be compatible with its own platform, and can also be expanded to be applied to various game platforms, such as Windows, Android, iOS, MacOS, Switch, or the like, and it can run in an Xinput or Dinput mode under Windows, an Android touch screen mapping mode, and an MFi mode of iOS, thereby greatly improving compatibility; user definition of various parameters, such as joystick adjustment, key change, macro programming, or the like, is realized, thus further improving convenience of a game operation. When the parameters are configured using the configuration terminal 40, such as a mobile phone, or the like, the configuration parameters can be changed in real time without interrupting the game operation.

In addition, the extension device 20 according to the present embodiment is easy to use, and for the game controller 10 and the game console 30, compatible protocols are used, and the game controller 10 and the game console 30 are not required to be modified.

So far, those skilled in the art should be aware that, although plural exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

That which is claimed:

1. A method for processing a game control instruction, the method being implemented by a processor of an extension device, the extension device comprising a controller interface connected with a console connection interface of a game controller and a console connection interface connected with a controlled game console, the method comprising:

acquiring a control instruction received by the extension device through the controller interface;

parsing the control instruction to obtain a first key instruction according to an instruction encoding rule of the game controller;

acquiring a second key instruction generated by triggering a key of the extension device;

recoding the first key instruction and the second key instruction according to an instruction encoding rule of the controlled game console to obtain a compatible instruction; and sending the compatible instruction to the controlled game console through the console connection interface of the extension device;

wherein before the step of acquiring a control instruction received by the extension device through the controller interface, the method further comprises: acquiring configuration information of the extension device, the configuration information comprising key value information, and the key value information being used for defining a key value of the key of the extension device;

wherein the step of acquiring a second key instruction generated by triggering a key of the extension device comprises: acquiring a trigger signal of the key of the extension device, and converting the trigger signal into the second key instruction according to the key value information;

wherein the configuration information further comprises a conflict handling option, and the conflict handling option comprises: controller priority, extension device priority, and concurrent use, and under a condition that the conflict handling option is set as the controller priority, the step of recoding the first key instruction and the second key instruction according to an instruction encoding rule of the controlled game console further comprises: identifying whether a duplicate key value exists in the first key instruction and the second key instruction, if yes, deleting a duplicate key value part in the second key instruction, and recoding the first key instruction and the second key instruction after the duplicate key value part is deleted according to the instruction encoding rule of the controlled game console;

under a condition that the conflict handling option is set as the extension device priority, the step of recoding the first key instruction and the second key instruction according to an instruction encoding rule of the controlled game console further comprises: identifying whether a duplicate key value exists in the first key instruction and the second key instruction, if yes, deleting a duplicate key value part in the first key instruction, and recoding the first key instruction after the duplicate key value part is deleted and the second key instruction according to the instruction encoding rule of the controlled game console; and under a condition that the conflict handling option is set as the concurrent use, the step of recoding the first key instruction and the second key instruction according to an instruction encoding rule of the controlled game console further comprises: identifying whether a duplicate key value exists in the first key instruction and the second key instruction, if yes, simultaneously retaining a duplicate key value part in the first key instruction and the second key instruction, and recoding the first key instruction and the second key instruction according to the instruction encoding rule of the controlled game console.

2. The method for processing a game control instruction according to claim 1, wherein the key of the extension device comprises a linear key, and the configuration information further comprises a linear function start-stop option, and the step of acquiring a trigger signal of the key of the extension device comprises:

receiving a pressing signal of the linear key; judging whether the linear function start-stop option is configured to be started; if yes, generating the trigger signal with a strength value according to a key stroke depth of the pressing signal; and if no, generating the trigger signal under a condition that the key stroke depth of the pressing signal is greater than a set trigger threshold.

3. The method for processing a game control instruction according to claim 1, wherein the configuration information further comprises controller modification information, and the step of recoding the first key instruction and the second key instruction according to an instruction encoding rule of the controlled game console further comprises: modifying the first key instruction according to the controller modification information, and recoding the modified first key instruction and the second key instruction according to the instruction encoding rule of the controlled game console.

4. The method for processing a game control instruction according to claim 1, the extension device further comprising a terminal connection interface, wherein the step of acquiring configuration information of the extension device comprises:

connecting a configuration terminal using the terminal connection interface of the extension device; and receiving a configuration file sent by the configuration terminal, and parsing the configuration file to obtain the configuration information.

5. The method for processing a game control instruction according to claim 4, wherein the controller interface is configured as a wired transmission interface matched with the console connection interface of the game controller; and the terminal connection interface and the console connection interface are configured as independent wireless transmission interfaces.

6. The method for processing a game control instruction according to claim 1, before the step of acquiring a control instruction received by the extension device through the controller interface, further comprising:

acquiring feature information of the game controller and the controlled game console;

determining the instruction encoding rule of the game controller according to the feature information of the game controller; and determining the instruction encoding rule of the controlled game console according to the feature information of the controlled game console.

7. The method for processing a game control instruction according to claim 6, wherein the step of determining the instruction encoding rule of the controlled game console according to the feature information of the controlled game console comprises:

inquiring whether the extension device stores a corresponding instruction encoding rule according to the feature information of the controlled game console;

if yes, calling the instruction encoding rule of the controlled game console; and if no, sending a rule inquiring request to a network service device, and acquiring an instruction encoding rule responding to the rule inquiring request from the network service device.

8. An extension device of a game controller configured to be attached to the game controller, comprising:

a controller interface configured to be connected with a console connection interface of the game controller;

a console connection interface configured to be connected with a controlled game console; and a processor, a memory and a machine executable program stored in the memory and run on the processor, the processor, when executing the machine executable program, implementing the method for processing a game control instruction according to claim 1.

9. A method for processing a game control instruction, the method being implemented by a processor of an extension device, the extension device comprising a controller interface connected with a console connection interface of a game controller and a console connection interface connected with a controlled game console, the method comprising:

acquiring a control instruction received by the extension device through the controller interface;

parsing the control instruction to obtain a first key instruction according to an instruction encoding rule of the game controller;

acquiring a second key instruction generated by triggering a key of the extension device;

recoding the first key instruction and the second key instruction according to an instruction encoding rule of the controlled game console to obtain a compatible instruction; and sending the compatible instruction to the controlled game console through the console connection interface of the extension device;

wherein before the step of acquiring a control instruction received by the extension device through the controller interface, the method further comprising:

acquiring feature information of the game controller and the controlled game console;

determining the instruction encoding rule of the game controller according to the feature information of the game controller; and determining the instruction encoding rule of the controlled game console according to the feature information of the controlled game console;

wherein the step of determining the instruction encoding rule of the controlled game console according to the feature information of the controlled game console comprises:

inquiring whether the extension device stores a corresponding instruction encoding rule according to the feature information of the controlled game console;

if yes, calling the instruction encoding rule of the controlled game console; and if no, sending a rule inquiring request to a network service device, and acquiring an instruction encoding rule responding to the rule inquiring request from the network service device.

10. The method for processing a game control instruction according to claim 9, wherein before the step of acquiring a control instruction received by the extension device through the controller interface, the method further comprises: acquiring configuration information of the extension device, the configuration information comprising key value information, and the key value information being used for defining a key value of the key of the extension device; and the step of acquiring a second key instruction generated by triggering a key of the extension device comprises: acquiring a trigger signal of the key of the extension device, and converting the trigger signal into the second key instruction according to the key value information.

11. The method for processing a game control instruction according to claim 10, wherein the key of the extension device comprises a linear key, and the configuration information further comprises a linear function start-stop option, and the step of acquiring a trigger signal of the key of the extension device comprises: receiving a pressing signal of the linear key; judging whether the linear function start-stop option is configured to be started; if yes, generating the trigger signal with a strength value according to a key stroke depth of the pressing signal; and if no, generating the trigger signal under a condition that the key stroke depth of the pressing signal is greater than a set trigger threshold.

12. The method for processing a game control instruction according to claim 10, wherein the configuration information further comprises controller modification information, and the step of recoding the first key instruction and the second key instruction according to an instruction encoding rule of the controlled game console further comprises: modifying the first key instruction according to the controller modification information, and recoding the modified first key instruction and the second key instruction according to the instruction encoding rule of the controlled game console.

13. The method for processing a game control instruction according to claim 10, the extension device further comprising a terminal connection interface, wherein the step of acquiring configuration information of the extension device comprises:

connecting a configuration terminal using the terminal connection interface of the extension device; and receiving a configuration file sent by the configuration terminal, and parsing the configuration file to obtain the configuration information.

14. The method for processing a game control instruction according to claim 13, wherein the controller interface is configured as a wired transmission interface matched with the console connection interface of the game controller; and the terminal connection interface and the console connection interface are configured as independent wireless transmission interfaces.

* * * * *